May 6, 1924.
A. O. HUBBARD
WHEEL
Filed Dec. 7, 1922
1,492,850
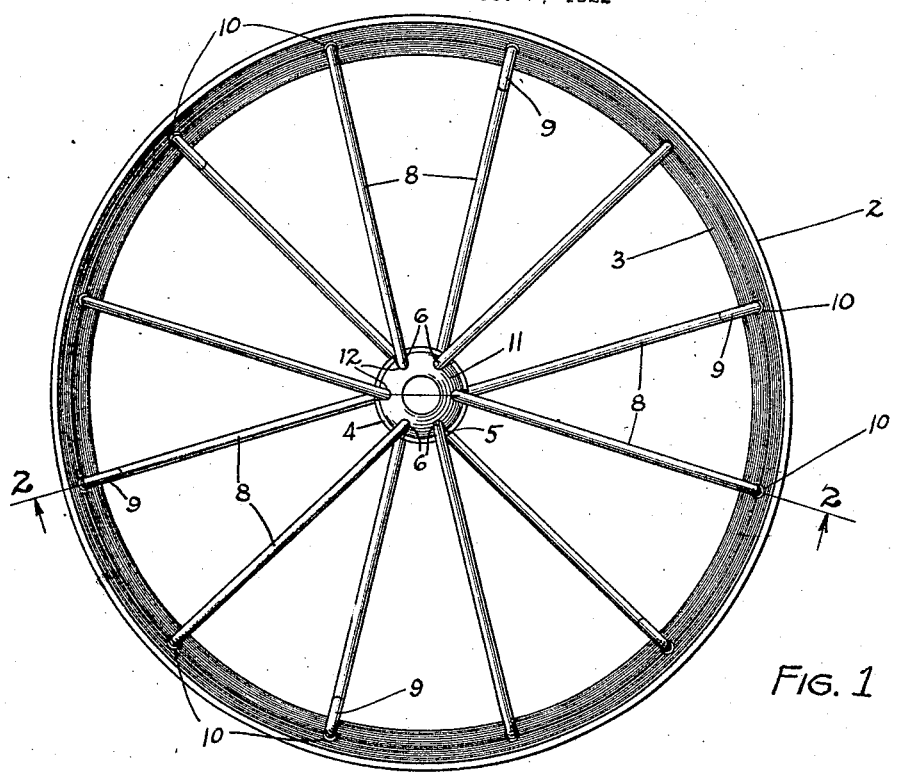
FIG. 1
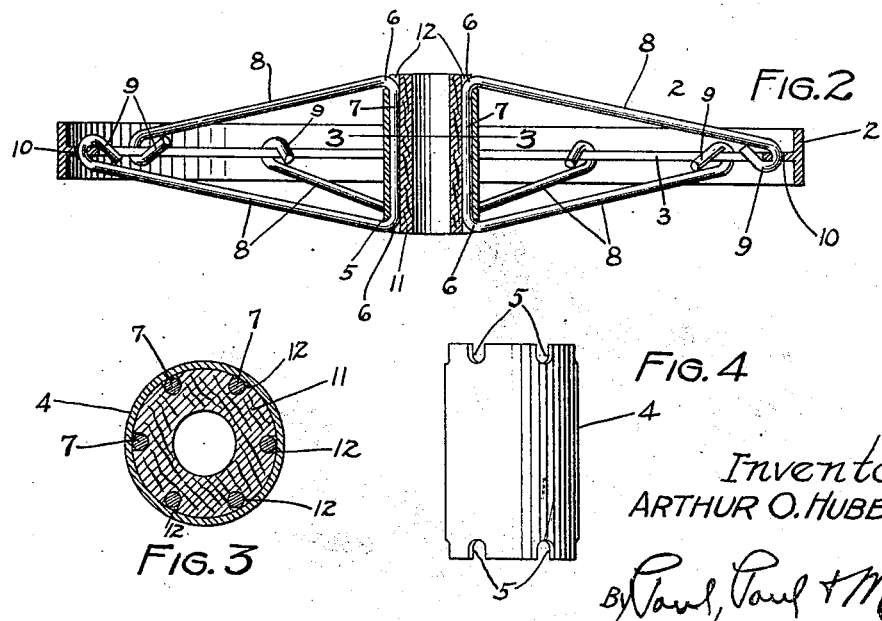
FIG. 2
FIG. 3
FIG. 4
Inventor
ARTHUR O. HUBBARD
By Paul, Paul & Moore
ATTORNEYS Patented May 6, 1924.

1,492,850

UNITED STATES PATENT OFFICE.

ARTHUR O. HUBBARD, OF MINNEAPOLIS, MINNESOTA.

WHEEL.

Application filed December 7, 1922. Serial No. 605,400.

*To all whom it may concern:*

Be it known that I, ARTHUR O. HUBBARD, a citizen of the United States, resident of Minneapolis, county of Hennepin, and State of Minnesota, have invented certain new and useful Improvements in Wheels, of which the following is a specification.

The object of my invention is to provide a wire-spoke wheel adapted for general wheel purposes but particularly designed for the comparatively small wheel of a child's wagon.

A further object is to provide a wheel of comparatively light construction and one that is strong and durable.

Other objects of the invention will appear from the following detailed description.

The invention consists in various constructions and combinations all as hereinafter described and particularly pointed out in the claims.

In the accompanying drawings forming part of this specification,

Figure 1 is a side view of a wire-spoke wheel embodying my invention;

Figure 2 is a sectional view on the line 2—2 of Figure 1;

Figure 3 is a sectional view on the line 3—3 of Figure 2;

Figure 4 is a detail view of the shell or jacket of the hub.

In the drawing, 2 represents the rim of the wheel, made preferably of a T-bar having a centrally arranged inwardly projecting annular flange 3. The outer face of the rim forms the tread of the wheel and a tire may be placed thereon if preferred. In this application, however, I have only shown the metallic rim.

4 represents a sleeve tubular in form of suitable length, provided at each end with recesses 5 spaced apart and having curved or rounded inner ends, preferably.

A series of wire spokes have bends 6 formed therein in a suitable forming machine, thereby forming a middle portion 7 and end extensions 8. The spokes are inserted through the sleeve with the bends 6 fitting in the recesses 5, and from these recesses, the spokes radiate outwardly to the rim of the wheel. The ends 9 of the spokes are bent at right angles substantially to the extensions 8 to adapt said ends to enter holes 10 provided in the annular flange 3, and when this is done, the ends 9 are bent inwardly and downwardly, thereby applying tension to the spokes 8 and exerting an outward or radial pull on the hub sleeve. The ends 9 are folded sufficiently to clinch in the flange and when drawn into contact with the spokes will hold the sleeve hub exactly in the center of the wheel, the bends 6 being all formed in a bending machine so that each one is exactly the same distance from the ends of the spokes and when the said ends are inserted into the holes in the flange and clinched, the hub will be rigidly secured.

As a bearing for the axle in the hub, I prefer to provide a cylindrical member 11 made preferably of fibrous material such as wood with its grain running lengthwise and boiled in oil or tallow to preserve the wood and provide a continuously lubricated surface. Any other suitable material may be used for the bearing member of the hub. This cylindrical member or core also serves as a cushion and tends to deaden the sound of the moving parts of the bearing. The outer surface of the core has longitudinal recesses or grooves therein which are adapted to receive the middle portion 7 of the spokes when the hub bearing is forced into the hub sleeve and this operation of forcing the wooden core into the sleeve serves to align and straighten out the portion 7 of the spokes so that when the wooden core is thrust into its seat in the sleeve, the section 7 of the spokes will be in accurate alignment and will be securely held between the core and sleeve. The forcing of the core into the sleeve may be accomplished in any suitable way preferably by endwise pressure thereon in a suitable machine.

The ends of the spokes are preferably oppositely arranged in the flange 3 so that the spokes are separated a considerable distance, one on one side of the wheel, entering the hole in the annular flange in one direction and the spoke on the opposite side of the wheel entering the hole in said flange from the opposite direction. With the spokes in this staggered relation, the hub and bearing will be firmly braced against a twisting or rotating movement, and the spokes having the long bearing in the hub and tensioned at each end of the hub, will hold it firmly in the center of the wheel under all conditions of use.

I claim as my invention:

1. A wheel hub comprising a sleeve, spokes passing through said sleeve and having their middle portions extending lengthwise therein and bearing on the inner surface thereof, the ends of said spokes extending outwardly and secured in the wheel rim, and a core having longitudinally arranged peripheral grooves to receive and straighten the middle portions of said spokes when said core is forced endwise into said hub sleeve, said core having an axle bearing therein.

2. A wheel hub comprising a sleeve having recesses in the ends thereof, spokes passing through said sleeve and having bends formed therein to enter said recesses, the middle portions of said spokes extending lengthwise of said sleeve and bearing on the inner surface thereof, the ends of said spokes entering holes in the wheel rim and when clinched therein applying an outward pull to said spokes and said hub, and a core having longitudinally arranged peripheral grooves to receive the middle portions of said spokes when said core is forced endwise into said hub sleeve, said core having a bearing therein for the wagon axle.

3. A wheel hub comprising a sleeve having recesses in the ends thereof, spokes passing through said sleeve and having bends formed therein to enter said recesses, the middle portions of said spokes extending lengthwise of said sleeve and bearing on the inner surface thereof, the ends of said spokes extending outwardly from said sleeve and secured in the wheel rim and being in staggered relation to resist a turning or twisting stress on said sleeve, and a wooden core having longitudinally arranged peripheral grooves to receive the middle portions of said spokes and straighten and align them when the core is forced endwise into said hub sleeve, said core having a bearing therein for the wagon axle.

4. A wheel hub comprising a sleeve, spokes passing through said sleeve and having their middle portions extending lengthwise therein and bearing on the inner surface thereof, the ends of said spokes extending outwardly and secured in the wheel rim, and a core of fibrous material adapted to absorb a lubricating agent and having longitudinally arranged peripheral grooves to receive and straighten the middle portions of said spokes when said core is forced endwise into said hub sleeve, said core having an axle bearing therein.

5. A wheel hub comprising an outer member, spokes seated in said member and having their outer portions secured in the wheel rim, and a core having an axle bearing therein and peripheral recesses to receive the hub portions of said spokes, said core being pressed endwise into said outer member and held against rotation therein by the engagement of said spokes with said recesses.

In witness whereof, I have hereunto set my hand this 29th day of November 1922.

ARTHUR O. HUBBARD.